Patented June 10, 1941

2,245,362

UNITED STATES PATENT OFFICE 2,245,362

PREPARATION OF 2-MERCAPTO THIAZOLINES

Paul Swithin Pinkney, Wilmington, Del., assignor to E. I. du Pont de Nemours & Company, Wilmington, Del., a corporation of Delaware No Drawing. Application February 21, 1940, Serial No. 320,010

10 Claims. (Cl. 260—302)

This invention relates to the preparation of 2-mercapto thiazolines and particularly from N-(2-hydroxyalkyl) formamides.

It has been found that 2-mercapto thiazolines are very desirable accelerators for the vulcanization of rubber. These compounds and processes for preparing the same are known and have been described in the literature. The processes described in the literature comprise heating an alkanol amine, such as ethanol amine, carbon disulfide and potassium hydroxide in alcohol under reflux. Such processes were not commercially practicable, particularly because of the low yields obtained and contamination of the products with undesirable impurities.

It is an object of the present invention to provide a new and improved method of preparing 2-mercapto thiazolines. Another object is to provide a method of preparing 2-mercapto thiazolines from N-(2-hydroxyalkyl) formamides. A further object is to provide an economical method of preparing 2-mercapto thiazolines from relatively cheap starting materials and in good yields. A still further object is to provide a one-step method of preparing 2-mercapto thiazolines from N-(2-hydroxyalkyl) formamides. Other objects are to advance the art. Still other objects will appear hereinafter.

The above and other objects may be accomplished in accordance with my invention, which comprises heating an N-(2-hydroxyalkyl) formamide with carbon disulfide at temperatures of from 120° C. to about 250° C. in a closed vessel under superatmospheric pressures and in the absence of both water and caustic alkali, employing at least 2 moles of carbon disulfide and 1 mole of the N-(2-hydroxyalkyl) formamide for each mole of the 2-mercapto thiazoline to be produced. I have found that, by such method, the N-(2-hydroxyalkyl) formamide is converted to a 2-mercapto thiazoline in good yields by a single-step process.

The N-(2-hydroxyalkyl) formamides, which are employed as starting materials in my process, are relatively cheap materials which may be prepared by the action of carbon monoxide and ammonia on 1,2-glycols, such as ethylene-glycol, at high temperatures and pressures in the presence of a catalyst. This is particularly true of the N-(2-hydroxyethyl) formamide, which is the preferred material for use in our process, and which is thereby converted into 2-mercapto thiazoline itself.

It appears that 1 mole of hydrogen sulfide and 1 mole of carbon oxysulfide are formed with each mole of 2-mercapto thiazoline produced. It is, therefore, essential that at least 2 moles, and preferably from 2 to 3 moles, of carbon disulfide and 1 mole of the N-(2-hydroxyalkyl) formamide be employed for each mole of the 2-mercapto thiazoline to be produced.

The temperature employed may be varied within wide limits. The temperature should generally be at least 120° C. and should not much exceed 250° C. The time required for completion of the reaction varies inversely with the temperature, being shorter at the higher temperatures. The most desirable temperatures appear to be from about 170° C. to about 200° C. At such temperatures the reaction will generally be completed in about 6 to about 10 hours.

It is necessary to employ a closed reaction vessel with the temperatures employed in order to avoid loss of reactants. When such a closed vessel is employed at such temperatures, pressures will be built up by the vapors of the reacting ingredients, the gaseous reaction products and, when a solvent is employed, by the vapors of the solvent. By the use of a solvent, particularly one which dissolves the gaseous reaction products, the maximum pressures developed at a given temperature, will be lower. Accordingly, a solvent is desirable where lower pressures are desired. However, the best results are generally obtained in the absence of a solvent.

When a solvent is employed, it should be substantially anhydrous, that is, it should contain no more than traces of water. Suitable solvents, which may be employed, are alcohols, particularly the lower alcohols of 6 or less carbon atoms, benzene, toluene, xylene, gasoline, carbon tetrachloride, ethers and the like, and mixtures of 2 or more of such solvents. In general, when a solvent is employed, the best results are obtained when the reactants are reasonably soluble therein at the reaction temperatures.

Some basic materials, such as, for example, the alkali metal formates and diethanol amine, have been found to act as catalysts in the reaction. The sodium and potassium formates have proved to be the most effective. By the use of such catalysts, it is possible to use the lower temperatures satisfactorily, or to increase the yields, or to decrease the time required for the reaction.

In order to recover the 2-mercapto thiazoline from the reaction mixture in a substantially pure form, the 2-mercapto thiazoline may be dissolved in dilute caustic alkali, the solution filtered to remove impurities, the filtrate acidified to precipitate the 2-mercapto thiazoline, which may then be filtered out, washed with water and dried. The 2-mercapto thiazoline may be further purified by crystallization from an appropriate solvent, such as alcohol or toluene. If the reaction is carried out in the presence of solvent, it will generally be preferable to remove the solvent by some suitable method, such as evaporation prior to treating the reaction mixture with the dilute caustic alkali. Other methods of purifying the 2-mercapto thiazoline and separating it from the other products of the reaction may be employed.

In order to illustrate my invention more clearly, the preferred modes of carrying the same into effect and the advantageous results to be obtained thereby, the following examples are given:

Example I

A solution of 27 parts of N-(2-hydroxyethyl) formamide and 23 parts of carbon disulfide in 60 parts of anhydrous ethanol was placed in a steel bomb and heated to at 170° C. for a period of six hours. The reaction mixture was heated to boiling with decolorizing charcoal and filtered. The filtrate was evaporated to dryness, and the residue was taken up in 10 per cent sodium hydroxide solution. The alkaline solution was filtered and the filtrate was acidified with dilute hydrochloric acid. The resulting precipitate of 2-mercapto thiazoline was collected on a filter and washed with cold water. The yield of 2-mercapto thiazoline was 9 parts, M. P. 104–6° C. (26% of the theoretical).

Example II

A solution of 18 parts (1 mole) of N-(2-hydroxyethyl) formamide and 38 parts (2.5 moles) of carbon disulfide in 75 parts of anhydrous ethanol was placed in a steel bomb and heated at 170° C. for a period of 6 hours. After evaporation of volatile material from the reaction mixture, the residue was taken up in 75 parts of 10% sodium hydroxide solution and warmed with decolorizing charcoal. The mixture was filtered hot and the cooled filtrate was acidified with dilute hydrochloric acid and cooled further to ensure complete precipitation of the product. The precipitate was washed on the filter with cold water and air dried. The yield of 2-mercapto thiazoline was 5.4 parts (23% of the theoretical).

Example III

The reaction was carried out as in Example II except that no solvent was added. The yield of 2-mercapto thiazoline was 14.9 parts (62% of the theoretical).

Example IV

The reaction was carried out as in Example II except that the bomb was heated at 120° C. for a period of 10 hours. The yield of 2-mercapto thiazoline was 0.8 part (3% of the theoretical).

Example V

The reaction was carried out as in Example IV except that 0.5 part of diethanolamine was added as a catalyst. The yield of 2-mercapto thiazoline was 2.4 parts (10% of the theoretical).

Example VI

The reaction was carried out as in Example IV except that 0.5 parts of sodium formate was added as a catalyst. The yield of 2-mercapto thiazoline was 8.5 parts (33% of the theoretical).

It will be understood that the above examples are given for illustrative purposes only. It will be readily apparent to those skilled in the art that many variations and modifications can be made in the process without departing from the spirit of my invention. For example, other N-(2-hydroxyalkyl) formamides may be substituted for the N-(2-hydroxyethyl) formamide employed in the examples. Some of such other N-(2-hydroxyalkyl) formamides are those derived from the following aminoalkanols:

1-amino-2-ethanol, 2-amino-1-propanol, 2-amino-1-butanol, 1-amino-2-butanol, 3-amino-2-butanol, 1-amino-2-methyl-2-propanol, 3-amino-2-pentanol, 2-amino-1-pentanol, 2-amino-3-pentanol, 1-amino-2-methyl-2-butanol, 3-amino-2-methyl-2-butanol, 2-amino-2-ethyl-1,3-propanediol, 2-amino-3-hexanol, 2-amino-1-phenylethanol, 2-amino-2-phenylethanol, 2-amino-1-cyclohexylethanol, 2-amino-2-methyl-3-hexanol, 3-amino-2-methyl-4-heptanol, 2-amino-2-propyl-1,3-propanediol, 3-amino-4-heptanol, 2-amino-2-isopropyl-1,3-propanediol, 3-amino-3-methyl-4-heptanol, 3-amino-3-methyl-2-pentanol, and 5-amino-4-octanol.

It will thus be apparent that I have provided a simple process for the preparation of 2-mercapto thiazolines in a single-step from substances which are readily available from the cheap raw materials, ammonia, carbon monoxide and the glycols. Process permits the direct conversion of crude N-(2-hydroxyethyl) formamide, prepared from ammonia, carbon monoxide and ethyleneglycol, into 2-mercapto thiazoline. There is no necessity for isolating and purifying intermediate products.

I claim:

1. The process of preparing a 2-mercapto thiazoline which comprises heating an N-(2-hydroxyalkyl) formamide and carbon disulfide at temperatures of from 120° C. to about 250° C. in a closed vessel under superatmospheric pressures and in the absence of both water and caustic alkali, employing at least 2 moles of carbon disulfide and one mole of the formamide for each mole of the 2-mercapto thiazoline to be produced.

2. The process of preparing 2-mercapto thiazoline which comprises heating N-(2-hydroxyethyl) formamide and carbon disulfide at temperatures of from 120° C. to about 250° C. in a closed vessel under superatmospheric pressures and in the absence of both water and caustic alkali, employing at least 2 moles of carbon disulfide and one mole of the formamide for each mole of the 2-mercapto thiazoline to be produced.

3. The process of preparing a 2-mercapto thiazoline which comprises heating an N-(2-hydroxyalkyl) formamide and carbon disulfide at temperatures of from about 170° C. to about 200° C. in a closed vessel under superatmospheric pressures and in the absence of both water and caustic alkali, employing at least 2 moles of carbon disulfide and one mole of the formamide for each mole of the 2-mercapto thiazoline to be produced.

4. The process of preparing a 2-mercapto thiazoline which comprises heating an N-(2-hydroxyalkyl) formamide and carbon disulfide at temperatures of from about 170° C. to about 200° C. in a closed vessel under superatmospheric pressures in the presence of a minor proportion of a catalyst and in the absence of both water and caustic alkali, employing at least 2 moles of carbon disulfide and one mole of the formamide for 5. The process of preparing a 2-mercapto thiazoline which comprises heating an N-(2-hydroxyalkyl) formamide and carbon disulfide at temperatures of from about 170° C. to about 200° C. in a closed vessel under superatmospheric pressures in the presence of a minor proportion of an alkali metal formate and in the absence of both water and caustic alkali, employing at least 2 moles of carbon disulfide and one mole of the formamide for each mole of the 2-mercapto thiazoline to be produced.

6. The process of preparing a 2-mercapto thiazoline which comprises heating an N-(2-hydroxyalkyl) formamide and carbon disulfide at temperatures of from about 170° C. to about 200° C. in a closed vessel under superatmospheric pressures in the absence of a solvent and in the absence of both water and caustic alkali, employing at least 2 moles of carbon disulfide and one mole of the formamide for each mole of the 2-mercapto thiazoline to be produced.

7. The process of preparing 2-mercapto thiazoline which comprises heating N-(2-hydroxyethyl) formamide and carbon disulfide at temperatures of from about 170° C. to about 200° C. in a closed vessel under superatmospheric pressures and in the absence of both water and caustic alkali, employing at least 2 moles of carbon disulfide and one mole of the formamide for each mole of the 2-mercapto thiazoline to be produced.

8. The process of preparing 2-mercapto thiazoline which comprises heating N-(2-hydroxyethyl) formamide and carbon disulfide at temperatures of from about 170° C. to about 200° C. in a closed vessel under superatmospheric pressures in the absence of a solvent and in the absence of both water and caustic alkali, employing at least 2 moles of carbon disulfide and one mole of the formamide for each mole of the 2-mercapto thiazoline to be produced.

9. The process of preparing 2-mercapto thiazoline which comprises heating N-(2-hydroxyethyl) formamide and carbon disulfide at temperatures of from about 170° C. to about 200° C. in a closed vessel under superatmospheric pressures in the presence of a minor proportion of a catalyst and in the absence of both water and caustic alkali, employing at least 2 moles of carbon disulfide and one mole of the formamide for each mole of the 2-mercapto thiazoline to be produced.

10. The process of preparing 2-mercapto thiazoline which comprises heating N-(2-hydroxyethyl) formamide and carbon disulfide at temperatures of from about 170° C. to about 200° C. in a closed vessel under superatmospheric pressures in the presence of a minor proportion of an alkali metal formate and in the absence of both water and caustic alkali, employing at least 2 moles of carbon disulfide and one mole of the formamide for each mole of the 2-mercapto thiazoline to be produced.

PAUL SWITHIN PINKNEY.